US010852849B2

(12) United States Patent
Grossman et al.

(10) Patent No.: US 10,852,849 B2
(45) Date of Patent: Dec. 1, 2020

(54) ENHANCING INPUT ON SMALL DISPLAYS WITH A FINGER MOUNTED STYLUS

(71) Applicant: AUTODESK, INC., San Rafael, CA (US)

(72) Inventors: Tovi Grossman, Toronto (CA); George Fitzmaurice, Toronto (CA); Haijun Xia, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 15/148,982

(22) Filed: May 6, 2016

(65) Prior Publication Data

US 2017/0031469 A1 Feb. 2, 2017

Related U.S. Application Data

(60) Provisional application No. 62/197,481, filed on Jul. 27, 2015.

(51) Int. Cl.
G06F 3/03 (2006.01)
G06F 3/0354 (2013.01)
G06F 3/038 (2013.01)

(52) U.S. Cl.
CPC ........ G06F 3/03545 (2013.01); G06F 3/0383 (2013.01); G06F 2203/0331 (2013.01)

(58) Field of Classification Search
CPC .... G06F 3/033; G06F 3/0354; G06F 3/03545; G06F 2203/04101; G06F 3/0317; G06F 3/03542; G06F 3/0386; G06F 3/0383; G06F 2203/0331; G06F 3/03
See application file for complete search history.

(56) References Cited

U.S. PATENT DOCUMENTS

| 9,632,598 | B1 * | 4/2017 | Sundara-Rajan | G06F 3/03545 |
| 2009/0322685 | A1 * | 12/2009 | Lee | G06F 3/011 345/173 |
| 2012/0331546 | A1 * | 12/2012 | Falkenburg | G06F 3/03545 726/16 |
| 2013/0016055 | A1 * | 1/2013 | Chuang | G06F 3/03545 345/173 |
| 2013/0285941 | A1 * | 10/2013 | Sugiura | G06F 3/017 345/173 |
| 2014/0035884 | A1 * | 2/2014 | Oh | G06F 3/03545 345/179 |

(Continued)

OTHER PUBLICATIONS

Annett, M. and Bischof, W. Hands, hover, and nibs: understanding stylus accuracy on tablets. GI '15, To appear.

(Continued)

Primary Examiner — Lunyi Lao
Assistant Examiner — Jarurat Suteerawongsa
(74) Attorney, Agent, or Firm — Artegis Law Group, LLP

(57) ABSTRACT

A finger-mounted stylus for performing touch-based input on a touchscreen includes a fingertip case configured to attach to a user fingertip, an extension arm that is coupled to the fingertip case and includes a conductive tip, wherein the extension arm is configured to position the conductive tip away from the fingertip case, and control circuitry configured to apply an electric charge to the conductive tip when the conductive tip is in contact with or proximate to the touchscreen.

21 Claims, 11 Drawing Sheets

(56) References Cited

U.S. PATENT DOCUMENTS

| | | | | |
|---|---|---|---|---|
| 2014/0160091 A1* | 6/2014 | Mann | .................... | G06F 3/0383 |
| | | | | 345/179 |
| 2014/0331146 A1* | 11/2014 | Ronkainen | ............ | G06F 3/0482 |
| | | | | 715/741 |
| 2015/0286293 A1* | 10/2015 | Gruhlke | ............. | G06F 3/03545 |
| | | | | 345/182 |
| 2015/0363034 A1* | 12/2015 | Hinckley | ............. | G06F 3/0414 |
| | | | | 345/173 |

OTHER PUBLICATIONS

Ashbrook, D., Baudisch, P., and White, S. Nenya: subtle and eyes-free mobile input with a magnetically-tracked finger ring. CHI '11, 2043-2046.

Ashbrook, D., Clawson, J., Lyons, K., Starner, T., and Patel, N. Quickdraw: the impact of mobility and on-body placement on device access time. CHI '08, 219-222.

Baudisch, P. and Chu, G. Back-of-device interaction allows creating very small touch devices. CHI '09, 1923-1932.

Benko, H, Wilson, A, and Baudisch, P. Precise selection techniques for multi-touch screens. CHI '06, 1263-1272.

Bi, X., Moscovich, T., Ramos, G., Balakrishnan, R., and Hinckley, K. An exploration of pen rolling for pen-based interaction. UIST '08, 191-200.

Bi, X., Li, Y., and Zhai, S. FFitts law: modeling finger touch with fitts' law. CHI '13, 1363-1372.

Chapuis, O. and Dragicevic, P. Effects of motor scale, visual scale, and quantization on small target acquisition difficulty. TOCHI'11, vol. 18, Issue 3, Article 13.

Chen, X., Grossman, T., and Fitzmaurice, G. Swipeboard: a text entry technique for ultra-small interfaces that supports novice to expert transitions. UIST '14. 615-620.

Fitts M. The information capacity of the human motor system in controlling the amplitude of movement. J. of Experimental Psychology, vol. 47, 1954, 381-391.

Grossman, T., Hinckley, K., Baudisch, P., Agrawala, M., and Balakrishnan, R. Hover widgets: using the tracking state to extend the capabilities of pen-operated devices. CHI '06, 861-870.

Harrison, C. and Hudson, S. Abracadabra: wireless, high-precision, and unpowered finger input for very small mobile devices. UIST '09, 121-124.

Harrison, C., Schwarz, J., and Hudson, S. TapSense: enhancing finger interaction on touch surfaces. UIST '11, 627-636.

Hinckley, K., Pahud, M., Benko, H., Irani, P., Guimbretière, F., Gavriliu, M., Chen, X., Matulic, F., Buxton, W., and Wilson, A. Sensing techniques for tablet+stylus interaction. UIST'14, 605-614.

Hinckley, K., Yatani, K., Pahud, M., Coddington, N., Rodenhouse, J., Wilson, A., Benko, H, and Buxton, B. Pen + touch = new tools. UIST '10, 27-36.

Holz, C. and Baudisch, P. The generalized perceived input point model and how to double touch accuracy by extracting fingerprints. CHI '10, 581-590.

Kienzle,W. and Hinckley, K. LightRing: always-available 2D input on any surface. UIST'14, 157-160.

Kim, J., He, J., Lyons, K., and Starner, T. The Gesture Watch: a wireless contact-free gesture based wrist interface. ISWC' 07, 15-22.

Laput, G. Xiao, R. Chen, X. Hudson, S., and Harrison, C. Skin buttons: cheap, small, low-powered and clickable fixed-icon laser projectors. UIST '14, 389-394.

MacKenzie, S., Sellen, A., and Buxton, W. A comparison of input devices in element pointing and dragging tasks. CHI 91, 161-166.

Oakley, I. and Lee, D. Interaction on the edge: offset sensing for small devices. CHI '14, 169-178.

Ogata, M., Sugiura, Y., Osawa, H., and Imai, M. iRing: intelligent ring using infrared reflection. UIST '12, 131-136.

Oney, S., Harrison, C., Ogan, A., and Wiese, J. ZoomBoard: a diminutive QWERTY soft keyboard using iterative zooming for ultra-small devices. CHI '13, 2799-2802.

Ren, X. and Mizobuchi, S. Investigating the usability of the stylus pen on handheld devices. SIGHCI'05, 12.

Ren, X. and Shinju, M. Improving selection performance on pen-based systems: a study of pen-based interaction for selection tasks. TOCHI'00, 7.3, 384-416.

Song, H., Benko, H., Guimbretiere, F., Izadi, S., Cao, X., and Hinckley, K. Grips and gestures on a multi-touch pen. CHI '11, 1323-1332.

Siek, K., Rogers, Y., and Connelly, K. Fat finger worries: how older and younger users physically interact with PDAs. INTERACT '05, 267-280.

Tian, F., Xu, L., Hongan Wang, Zhang, X., Liu, Y., Setlur, V., and Dai, G. Tilt menu: using the 3D orientation information of pen devices to extend the selection capability of pen-based user interfaces. CHI '08, 1371-1380.

Vogel, D. and Baudisch P. Shift: a technique for operating pen-based interfaces using touch. CHI '07, 657-666.

Xiao, R., Laput, G., and Harrison, C. Expanding the input expressivity of smartwatches with mechanical pan, twist, tilt and click. CHI '14, 193-196.

Yang, X., Grossman, T., Wigdor, D., and Fitzmaurice, G. Magic finger: always-available input through finger instrumentation. UIST '12, 147-156.

Yatani, K., Partridge, K., Bern, M., and Newman, M. Escape: a target selection technique using visually-cued gestures. CHI '08, 285-294.

* cited by examiner

ENHANCING INPUT ON SMALL DISPLAYS WITH A FINGER MOUNTED STYLUS

CROSS-REFERENCE TO RELATED APPLICATIONS

This application claims benefit of United States Provisional Patent Applications filed Jul. 27, 2015 and having Ser. No. 62/197,481. The subject matter of this related application is hereby incorporated herein by reference.

BACKGROUND OF THE INVENTION

Field of the Invention

The present invention relates generally to computer science and mechanical design and, more specifically, to enhancing input on small displays with a finger-mounted stylus.

Description of the Related Art

Smartwatches and other wearable computing devices have become increasingly popular in recent years, bringing convenience to basic computer-implemented tasks, such as checking a calendar and setting an alarm. With continued improvements to computation and battery technologies, complex tasks on small wearable devices are now technically feasible, even though user input interactions with such devices remains problematic.

More particularly, smartwatches typically rely on touch-based gestures on the display screen as the primary input modality. The so-called "fat finger" problem can occur on any touch device, since the contact area of a fingertip is frequently larger than the intended target region on a touch screen. However, this problem is exacerbated by the ultra-small display size of a smartwatch, where a single finger can also occlude more than half of the display at the instant that a touch-based gesture is being performed, resulting in inaccurate inputs. Furthermore, the icons and links displayed on a smartwatch screen are poorly suited to precise touch-based input, since such icons are generally much smaller than a user fingertip. Consequently, icon size can further reduce input accuracy on a smartwatch or other devices with ultra-small displays.

One approach to address unwanted occlusion of a smartwatch screen during user inputs is to displace the interaction away from the watch face. For example, hardware augmentations to a smartwatch can enable user inputs to be completed without directly touching the smartwatch, such as by swiping on a wrist band or arm, performing midair gestures, and the like. Unfortunately, such indirect actions negate the direct interaction paradigm to which users have become accustomed with smartphones and smartwatches. Alternatively, designers may adapt the user interface of a smartwatch for lower-precision input, supporting swipes or multi-level taps, but such interactions greatly limit the tasks and interfaces that can be presented to the user.

As the foregoing illustrates, there is a need in the art for more effective techniques for performing user inputs on a smartwatch or other small, touch-based display screens.

SUMMARY OF THE INVENTION

One embodiment of the present invention sets forth a finger-mounted stylus for performing touch-based input on a touchscreen includes a fingertip case configured to attach to a user fingertip, an extension arm that is coupled to the fingertip case and includes a conductive tip, wherein the extension arm is configured to position the conductive tip away from the fingertip case, and control circuitry configured to apply an electric charge to the conductive tip when the conductive tip is in contact with or proximate to the touchscreen.

One advantage of the disclosed embodiment is that gesture-based inputs can be precise and accurately performed on a touchscreen of a wearable device, even when the touchscreen of the wearable device is an ultra-small screen. A further advantage is that the vocabulary of gesture-based inputs that can be reliably performed on a wearable device is greatly expanded.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
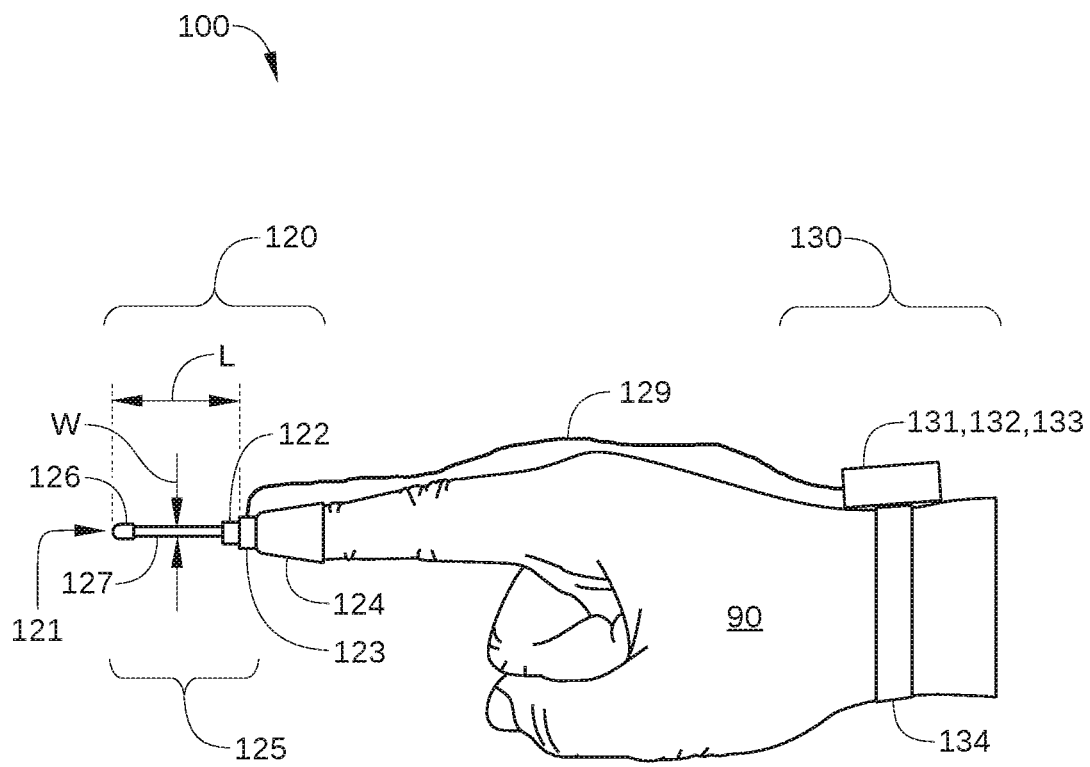
FIG. 1 illustrates a nanostylus system disposed on a user hand and configured to implement one or more aspects of the present invention.
Figure 2:
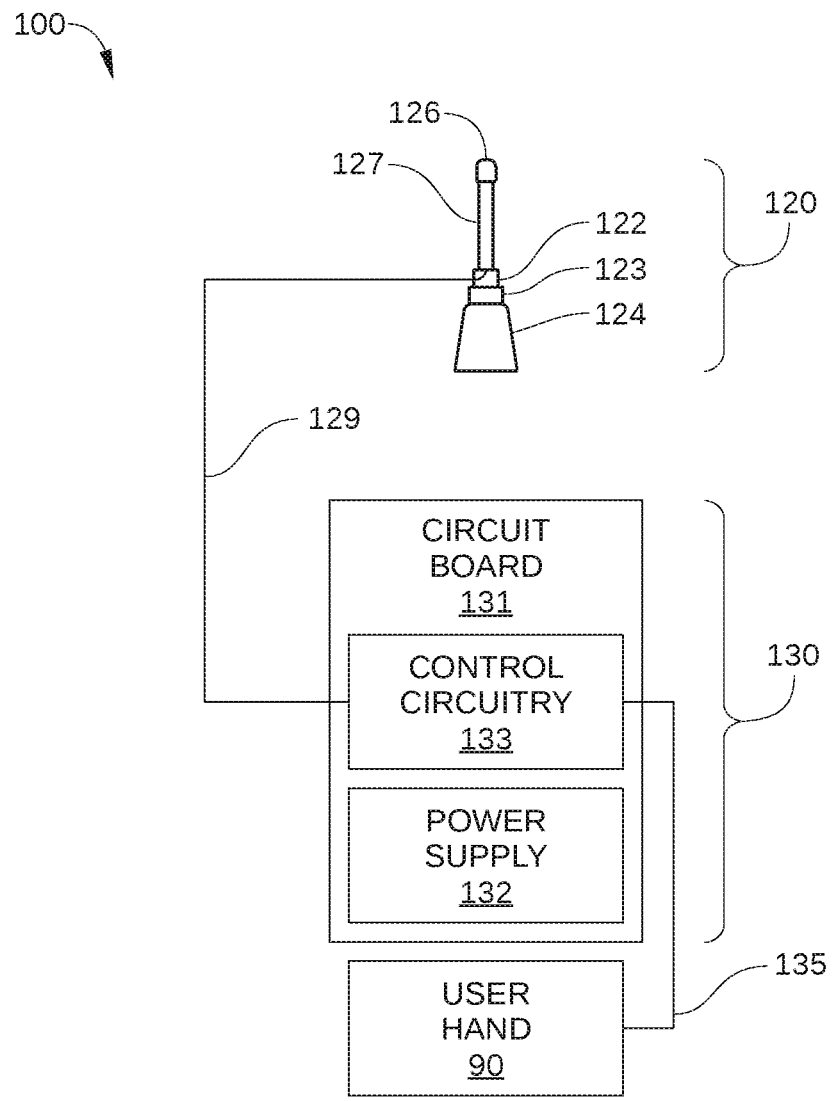
FIG. 2 is a schematic illustration of the nanostylus system of FIG. 1, according to various embodiments of the present invention.

FIG. 1 illustrates a nanostylus system 100 disposed on a user hand 90 and configured according to various aspects of the present invention. FIG. 2 is a schematic illustration of nanostylus system 100, configured according to various aspects of the present invention. As shown, Nanostylus system 100 includes, without limitation, a finger-mounted stylus with an ultra-thin nib 121 that eliminates or reduces occlusion of and enables high-precision input on an ultra-small touchscreen, such as that of a smartwatch or other small form-factor wearable computing device. In the embodiment illustrated in FIGS. 1 and 2, some components of nanostylus system 100 are disposed in a thimble assembly 120 and other components are disposed in a wrist assembly 130. In other embodiments, all components of nanostylus 100 may be disposed in thimble assembly 120, such as when nanostylus system 100 includes a suitably miniaturized power supply.

Nanostylus system 100 includes ultra-thin nib 121, an insulator 122, a nib coupling 123, and a fingertip case 124, all disposed within thimble assembly 120. Nanostylus system 100 also includes a circuit board 131, a power supply 132, control circuitry 133, a wrist band 134, and a charging connection 135, all disposed within wrist assembly 130. In addition, a shielded wire 129 connects ultra-thin nib 121 with control circuitry 133 as shown, and is generally shielded to reduce or eliminate the effects of stray signals.

Thimble assembly 120 includes fingertip case 124 and a head 125 mounted thereon. Head 125 includes ultra-thin nib 121, insulator 122, and nib coupling 123. In some embodiments, head 125 may be configured as a detachable component. In such embodiments, a user can swap one head 125 with a different head 125 that has a different nib length L, so that nanostylus system 100 may be modified based on user preference.

Ultra-thin nib 121 includes a conductive tip 126 that is disposed on a conductive extension 127 and is configured to interact with a touchscreen so that a user can input data via the touchscreen. Thus, in some embodiments, conductive tip 126 includes a material that is electrically conductive, so that when a user touches a surface of a touchscreen, a distortion in the electrostatic field of the touchscreen results, causing a measurable change in capacitance of a corresponding location of the touchscreen. In addition, conductive tip 126 generally includes a material that is unlikely to scratch or mar a touchscreen surface. For example, conductive tip 126 may include a conductive polymer and have a smooth, rounded surface for contacting a touchscreen.

Conductive extension 127 connects conductive tip 126 to nib coupling 123. Conductive extension is further configured to position conductive tip 126 away from fingertip case 124, so that a user can readily see conductive tip 126 when a user inputs data via nanostylus system 100. In addition, conductive extension 128 is configured with a relatively narrow width W, so that ultra-thin nib 121 occludes very little of a touchscreen when a user inputs data via nanostylus system 100. Furthermore, conductive extension 128 is configured to conductively couple conductive tip 126 with shielded wire 129. Conductive tip 126 can be much smaller than the contact patch of a fingertip contacting a touchscreen, or of a surface tip of a passive stylus. For example, in some embodiments, conductive tip 126 and conductive extension may each have a width of about 0.5 mm to 3 mm. By contrast, the contact patch of a fingertip contacting a touchscreen may be on the order of 1 cm or more.

In some embodiments, conductive extension 127 has a length L and extends at an angle of orientation from fingertip case 124 so that a portion of conductive extension 127 is also visible to a user when nanostylus system 100 is employed by the user when performing touch-based input gestures on a touchscreen of a wearable computing device. For example, in some embodiments, conductive extension 127 is configured to extend away from fingertip case 124 in a direction that is substantially parallel to a longitudinal axis 124A of a finger 91 on which fingertip case 124 is worn, i.e., along the projection of finger 91. In such embodiments, length L may be between about 10 mm and about 35 mm. In placing conductive tip 126 on a target region of a touchscreen, there is generally a trade-off between accuracy and speed of placement, where a longer length L facilitates faster placement, and a shorter length L facilitates more accurate placement. Thus, length L of conductive extension 127 may be selected based on a need for higher accuracy when performing touch-based input gestures, a need for higher speed when performing touch-based input gestures, and/or on a personal preference of a particular user.

In some embodiments, conductive extension 127 may be configured to partially or entirely retract into fingertip case 124. For example, when nanostylus system 100 is not in use, conductive extension can be retracted to prevent damage thereto. Alternatively or additionally, conductive extension 127 may be configured to extend to variable lengths L, so that a user can adjust length L as desired.

Because conductive tip 126 is electrically coupled to control circuitry 133 via conductive extension 127 and shielded wire 129, an electric charge can be applied to conductive tip 126 when nanostylus system 100 is worn on user hand 90. Consequently, conductive tip 126 can trigger the sensing mechanism of a capacitive touchscreen that is configured for finger inputs by distorting the electrostatic field of the touchscreen as much as a significantly larger finger contact patch or passive stylus. Thus, even though conductive tip 126 interacts with a much smaller region of the capacitive touchscreen than a fingertip, contacting the touchscreen with conductive tip 126 still results in a touch event being registered by the touchscreen, as illustrated in FIGS. 3A-3C.

Figure 3A:
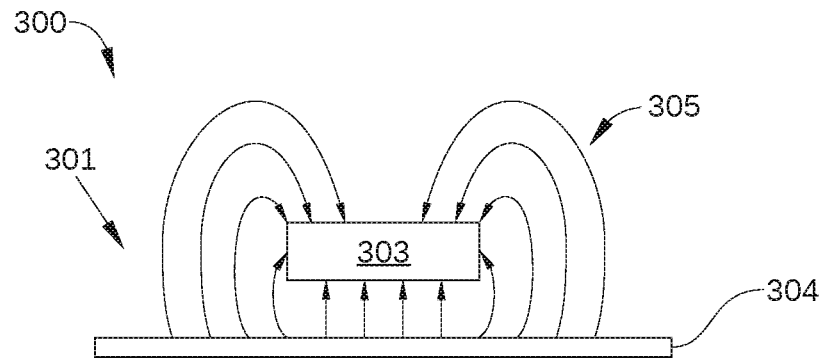
FIG. 3A is a schematic cross section of a region of a capacitive touchscreen.
Figure 3B:
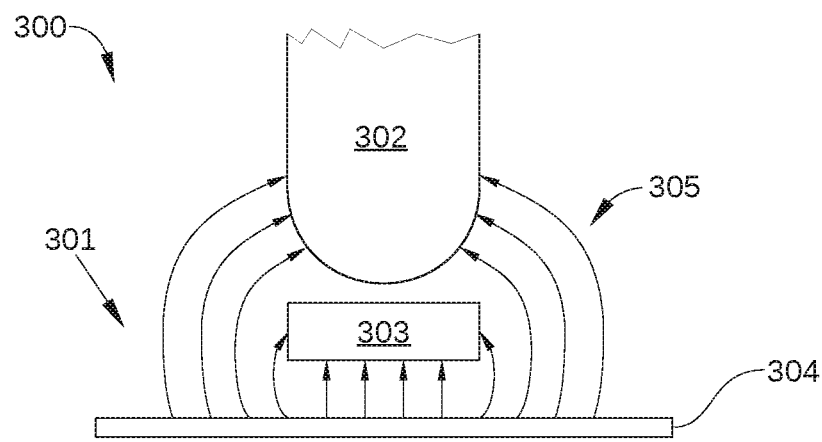
FIG. 3B is a schematic cross section of the region shown in FIG. 3A being contacted by a conductive member.
Figure 3C:
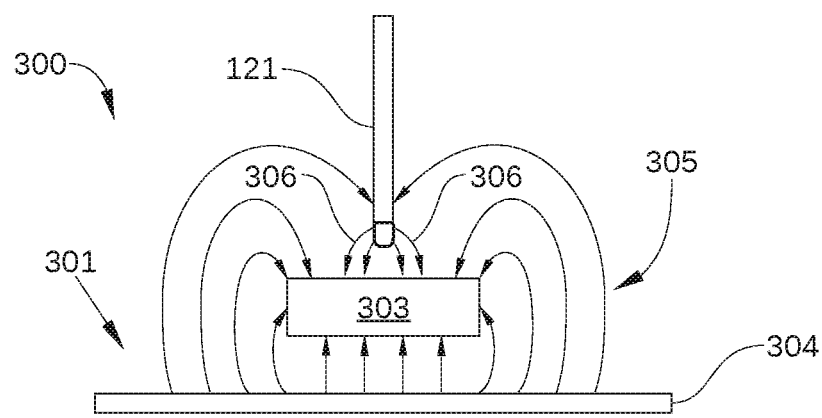
FIG. 3C is a schematic cross section of the region shown in FIG. 3A being contacted by a conductive tip, according to various embodiments of the present invention.

FIG. 3A is a schematic cross section of a region 301 of a capacitive touchscreen 300. FIG. 3B is a schematic cross section of region 301 being contacted by a conductive member 302. FIG. 3C is a schematic cross section of region 301 being contacted by conductive tip 126, configured according to various embodiments of the present invention. Region 301 includes a sense line 303 and a drive line 304 that is perpendicular to sense line 303. Electric field lines 305 indicate the electrostatic field distribution between sense line 303 and drive line 304. As shown in FIG. 3A, all of electric field lines 305 terminate at sense line 305, and no touch event is registered. In FIG. 3B, the presence of conductive member 302, which may be a passive stylus (e.g., 5 mm to 10 mm in width) or a user finger, is registered as a touch event at the intersection of sense line 303 and drive line 304, since a significant portion of electric field lines 305 terminates at conductive member 302. That is, sufficient signal is drawn from drive line 304 that a touch event is triggered. In FIG. 3C, the presence of ultra-thin nib 121 is also registered as a touch event at the intersection of sense line 303 and drive line 304, since electric field lines 305 are also significantly affected. This is because ultra-thin nib 121 can send a negative charge 306 to sense line 303, thereby distorting the electric field between sense line 303 and drive line 304 to a degree similar to that by much larger conductive member 302. Thus, ultra-thin nib 121 enables an active-stylus interaction with capacitive touchscreen 300, in which precise control of the positioning of conductive tip 126 is enabled.

Returning to FIG. 1, insulator 122 electrically insulates conductive extension 127 from fingertip case 124, and may include any technically feasible electrically insulative material. Nib coupling 123 connects head 125 to fingertip case 124. As noted above, in some embodiments nib coupling 123 is not a permanent connection, and instead is configured as a removable mechanical attachment point for head 125, such as a bayonet mount, a threaded connection, and the like. Fingertip case 124 is configured to securely attach thimble assembly 120 to the tip of a user finger, for example the index finger. In some embodiments, fingertip case 124 may be made available in a plurality of sizes, to ensure that each user of nanostylus system 100 can input data to a touchscreen without significant relative movement between the finger of the user and fingertip case 124. For example, in some embodiments, fingertip case 124 includes one or more molded or 3D printed components to ensure that an adequate fit is achieved for a particular user.

As noted above, wrist assembly 130 may include circuit board 131, power supply 132, control circuitry 133, and charging connection 135, mounted on wrist band 134. Circuit board 131 may include any technically feasible structure for electrically connecting and supporting power supply 132 and control circuitry 133. In addition, circuit board 131 is configured to provide electrical connections for shielded wire 129 and charging connection 135, as shown. Power supply 132 may be any suitable energy source suitable for use in nanostylus system 100, such as a storage battery, and is configured to provide power to nanostylus system 100 during operation. For example, in some embodiments, power supply 132 is a rechargeable battery.

Control circuitry 133 may include any suitable control and logic circuitry capable of processing data and/or executing software applications to facilitate operation of nanostylus system 100 as described herein. Thus, in some embodiments, control circuitry 133 may include a controller for nanostylus system 100, such as a central processing unit (CPU), an application-specific integrated circuit (ASIC), a field programmable gate array (FPGA), any other type of processing unit, or a combination of different processing units. In addition, control circuitry 133 may include memory and/or data storage configured to store any software programs, operating system, drivers, and the like, that facilitate operation of nanostylus system 100. For example, control circuitry 133 may include volatile memory, such as a random access memory (RAM) module, and/or non-volatile memory, such as a flash memory unit, a read-only memory (ROM), or any other type of memory unit or combination thereof suitable for use in nanostylus system 100.

Charging connection 135 is configured to electrically connect to the hand, wrist, or finger of a user, so that an amplified charge associated with the user can be reversed. This signal is amplified by control circuitry 133 and reversed by the human body. Wrist band 134 attaches wrist assembly 130 to a user during operation. In some embodiments, charging connection 135 may be incorporated partially or completely into wrist band 134.

Figure 4A:
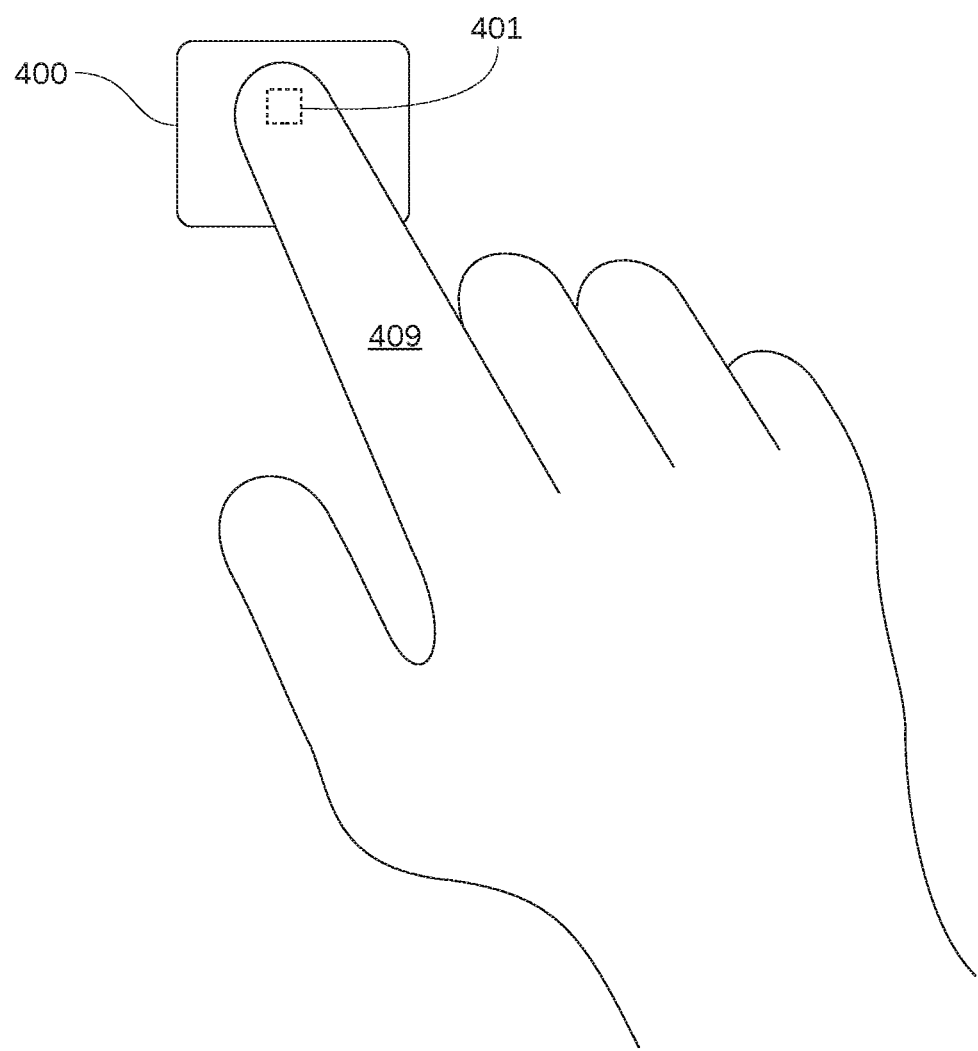
FIG. 4A is an illustration of a user performing conventional touch-based inputs to an ultra-small touchscreen of a wearable device.
Figure 4B:
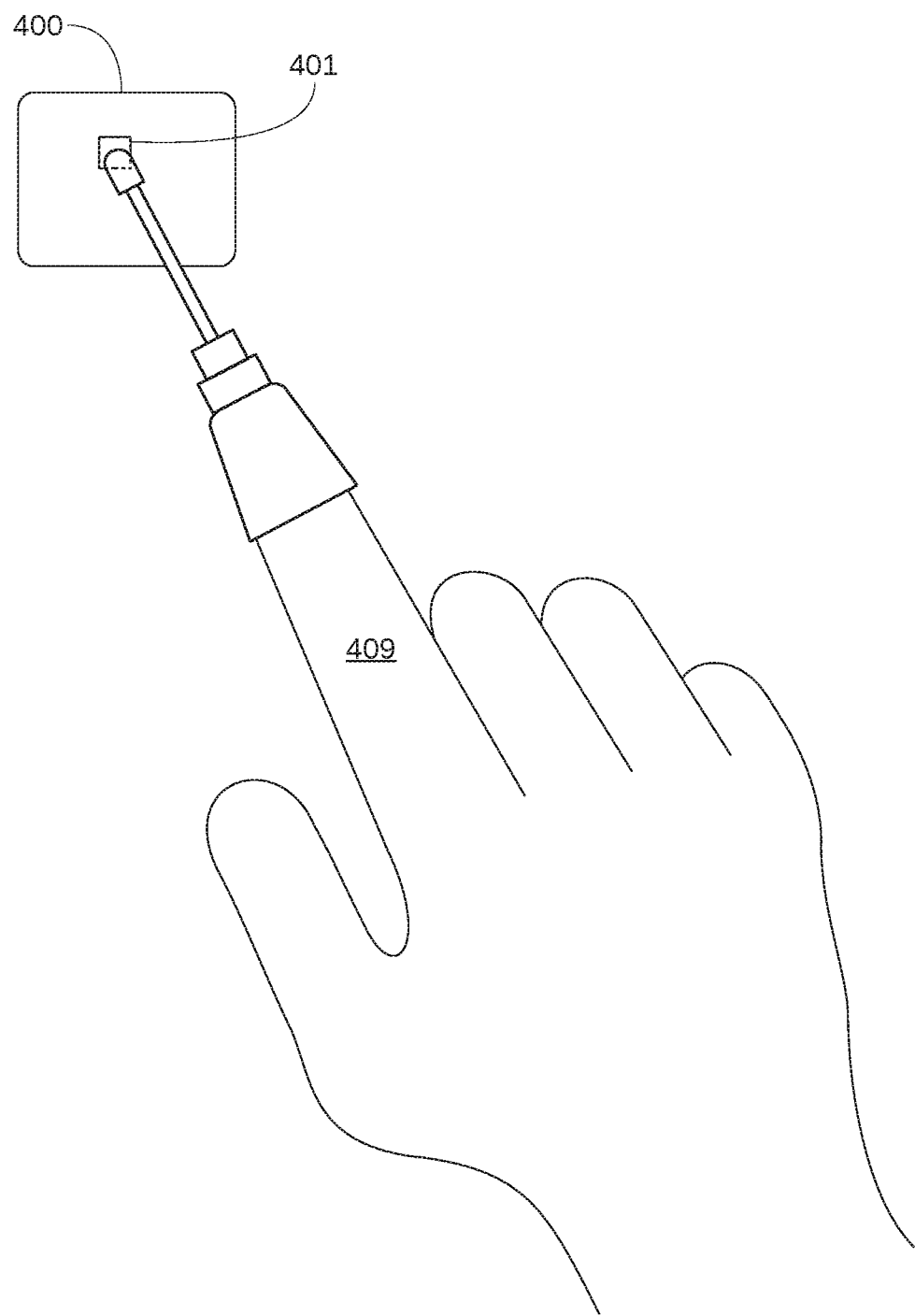
FIG. 4B is an illustration of a user performing touch-based inputs to an ultra-small touchscreen of a wearable device via a nanostylus system, according to various embodiments of the present invention.

In operation, a user wearing nanostylus system 100 (as shown in FIG. 1) performs inputs to a touchscreen by contacting one or more target regions on the touch screen with conductive tip 126. As illustrated in FIGS. 4A and 4B, ultra-thin nib 121 of nanostylus system 100 greatly reduces occlusion of a touchscreen when inputs are performed. FIG. 4A is an illustration of an ultra-small touchscreen 400 of a wearable device, such as a smartwatch, while a user performs touch-based inputs with a finger 409. As shown, selecting a target region 401 on ultra-small touchscreen 400 results in significant occlusion of ultra-small touchscreen 400. For example, when target region 401 is disposed in an upper portion of ultra-small touchscreen 400, 60% or more of ultra-small touchscreen 400 may be occluded by finger 409. FIG. 4B is an illustration of ultra-small touchscreen 400 while a user performs touch-based inputs via nanostylus system 100, according to various embodiments of the present invention. In contrast to finger-based inputs, selecting target region 401 with nanostylus system 100 results in very little occlusion of ultra-small touchscreen 400. For example, selection of target region 401 via nanostylus system 100 may result in 15% or less of ultra-small touchscreen 400 being occluded. Furthermore, the majority of the portion of ultra-small touchscreen 400 that is occluded by nanostylus system 100 is not proximate to target region 401.

Because ultra-thin nib 121 effectively eliminates occlusion of a touchscreen when inputs are performed, and because ultra-thin nib 121 enables precise selection of a target region on the touchscreen, a user can accurately contact the very small target regions associated with an ultra-small touchscreen of a wearable computing device, such as a smartwatch. Thus, nanostylus system 100 enables the implementation of greatly enhanced graphical applications on smartwatches and other wearable devices with ultra-small touchscreens. Specifically, nanostylus system 100 enables precise swiping inputs for interacting with graphical applications and precise selection inputs for menu-oriented applications, such as e-mail, address lists, and the like. Furthermore, since the target regions on an ultra-small touchscreen can be reduces to just a few millimeters in size, a full QWERTY keyboard can be displayed on an ultra-small touchscreen, enabling composition of short e-mails, lists, and other text editing without being unduly cumbersome.

In the embodiments described above in conjunction with FIGS. 1-4, nanostylus system 100 is configured with an active, i.e. powered, stylus. However, in other embodiments, nanostylus system 100 may be configured with a passive, unpowered stylus. For example, nanostylus system 100 may include a conductive tip 126 that is significantly smaller than the contact patch of a fingertip contacting a touchscreen, but is still configured to trigger the sensing mechanism of a capacitive touchscreen without applying a charge to the touchscreen.

Figure 5:
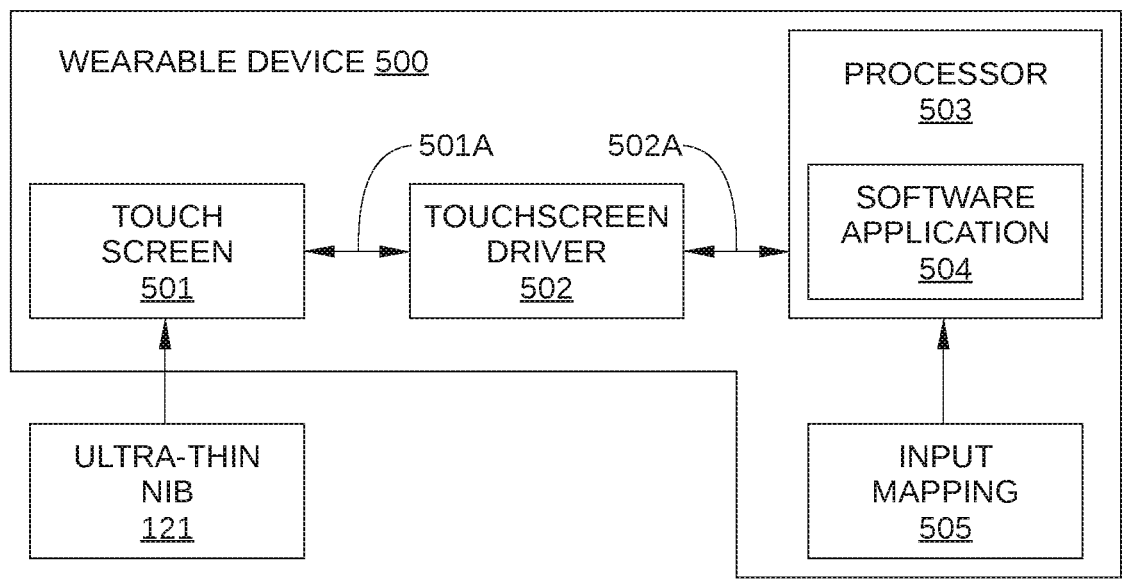
FIG. 5 is a block diagram illustrating the interaction of the nanostylus system of FIG. 1 with a wearable device, according to various embodiments of the present invention.

FIG. 5 is a block diagram illustrating interaction of nanostylus system 100 with a wearable device 500, according to various embodiments. Wearable device 500 may be any computing device that is configured to be worn by a user and includes a touchscreen for receiving user inputs. For example, wearable device may be a smartwatch, a fitness tracker, a sport tracker, a health monitor, a navigation tool, a media device, a communication device, and the like. Wearable device 500 includes a touchscreen 501, a touchscreen driver 502, a processor 503, a software application 504, and an input mapping 505.

Touchscreen 501 may be a display screen configured to display graphical images and/or videos to an end-user or wearer of wearable device 500. In addition, touchscreen 501 includes a capacitive touchscreen panel for receiving touch-based user input. Touchscreen 501 may be an ultra-small capacitive screen that is, for example, on the order of a few centimeters square. Consequently, finger-based input generally results in high occlusion of touchscreen 501 when user inputs are received, as illustrated above in conjunction with FIG. 4A. In addition, finger-based input into touchscreen 501 may be highly inaccurate when target areas on touchscreen 501 (i.e., displayed buttons, menu options, and other icons), are only a few millimeters in size. Thus, unlike the touchscreens associated with hand-held computing devices, such as smartphones, touchscreen 501 is characterized by being relatively small compared to the finger of a typical user. For example, in some embodiments, the width and/or the height of touchscreen 501 may be on the order of one to three finger widths, so that entry of touch-based gestures on touchscreen 501 typically results in half or more of touchscreen 501 being occluded by the finger performing the touch-based gesture.

Touchscreen driver 502 is a software, firmware, or hardware construct configured to receive signals 501A from touchscreen 501 and translate signals 501A into signals, such as signals 502A, representing specific touch-based gestures, including taps, double-taps, and swipes. Touchscreen driver 502 is further configured to generate a location on touchscreen 501 associated with each touch-based gesture. Touchscreen driver 502 then transmits signals 502A, which represent touch-based gestures and associated locations, to software application 504 running on processor 503.

Processor 503 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor 503 may be any technically feasible hardware unit capable of processing data and/or executing software applications, including software application 504.

Software application 504 may be any suitable application that can run on processor 503 and includes a graphical user interface displayed on touchscreen 501. Consequently, software application 504 is configured to receive touch-based user inputs via touchscreen 501 as an input mechanism and respond accordingly. In operation, software application 504 receives a touch-based gesture and an associated screen location from touchscreen driver 502, for example as signals 502A. Then, based on input mapping 505 stored locally in wearable device 500, software application 504 generates whatever output or executes whatever function is mapped to the touch-based gesture and associated screen location associated with signals 502A. For example, a single tap at a particular location may correspond to the selection of an icon that includes that location, and a double tap on a displayed icon may correspond to the opening of a menu or application that is associated with the displayed icon. In another example, a swipe gesture on touchscreen 501 may correspond to the dragging of a selected icon to a different location on touchscreen 501, the drawing of a line, the expansion in size of a selected object, the panning of displayed content, and the like.

Because input mapping 505 can be different for any particular software application 504, the same touch-based input to touchscreen 501 may have different effects, depending on the particular software application 504 currently displaying content on touchscreen 501. For example, a double-tap may be mapped to a zoom-in function of a first software application 504, whereas in a second software application 504, a double-tap on a particular icon may be mapped to closing the second software application 504. In some embodiments, input mapping 505 may be fully defined by developers of each software application 504. In other embodiments, input mapping 505 may be user-configurable.

In yet other embodiments, input mapping 505 may include a combination of developer-encoded and user-configurable definitions.

Figure 6:
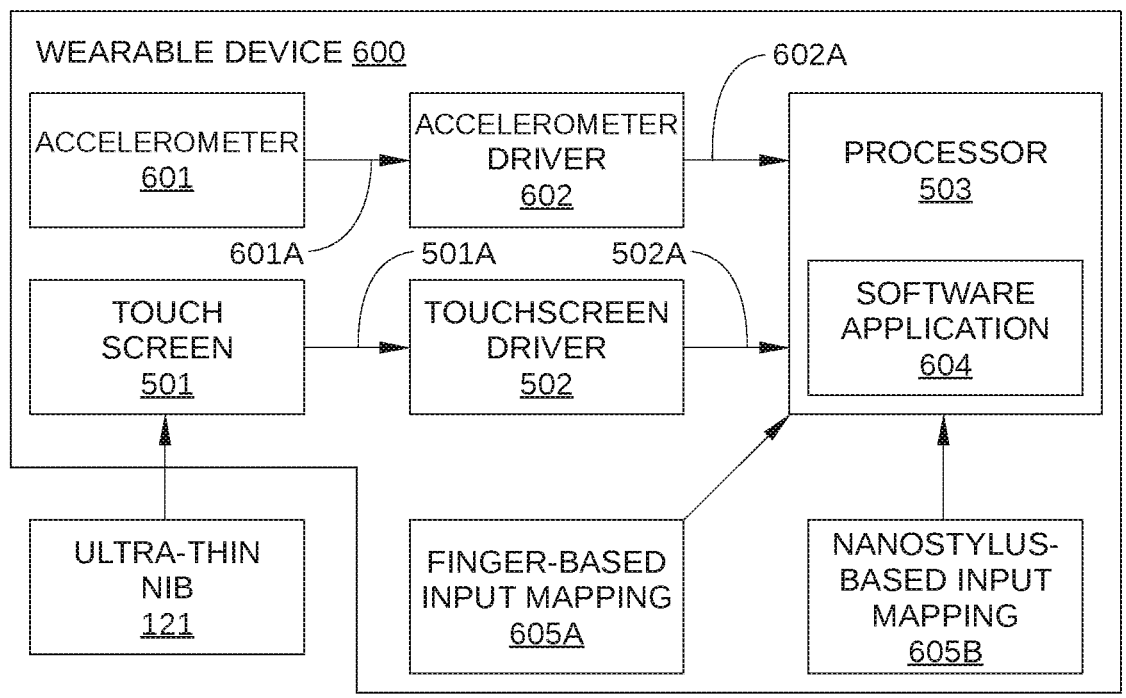
FIG. 6 is a block diagram illustrating interaction of the nanostylus system of FIG. 1 with a wearable device, according to various other embodiments of the present invention.

FIG. 6 is a block diagram illustrating interaction of nanostylus system 100 with a wearable device 600, according to another embodiment of the present invention. Wearable device 600 may be substantially similar to wearable device 500 of FIG. 5, with the addition of an accelerometer 601, an acceleration/attitudinal output 601A, an accelerometer driver 602, a particularly configured software application 604, a finger-based input mapping 605A, and a nanostylus-based input mapping 605B.

Accelerometer 601 may be configured to measure a force of acceleration (i.e., movement) and/or gravity (i.e., angle of inclination relative to the Earth) associated with wearable device 600. In some embodiments, accelerometer 601 may include one or more of any technically feasible piezoelectric sensors and/or solid-state accelerometers that can generate acceleration/attitudinal output 601A. In operation, accelerometer 601 may transmit acceleration/attitudinal output 601A to accelerometer driver 602 as shown.

Accelerometer driver 602 is a software, firmware, or hardware construct configured to receive signals from accelerometer 601 and translate these signals into specific acceleration/attitudinal outputs 601A. Accelerometer driver 602 then transmits these acceleration/attitudinal outputs 601A to software application 604 running on processor 503.

In some embodiments, software application 604 may be substantially similar to software application 504 of FIG. 5, except that software application 604 is also configured to interpret touch-based gestures associated with signals 502A differently depending on how signals 502A are generated. Specifically, when signals 502A are generated via a finger-based input, software application 604 generates an output or executes a function according to finger-based input mapping 605A. That is, for a touch-based gesture and screen location included in signals 502A, software application 604 generates the output or executes the function that is mapped to that touch-based gesture in finger-based input mapping 605A. By contrast, when signals 502A are generated via an input via nanostylus system 100, software application 604 generates an output or executes a function according to nanostylus-based input mapping 605B. Thus, for a nanostylus-based gesture and screen location included in signals 502A, software application 604 generates the output or executes the function that is mapped to that nanostylus-based gesture in nanostylus-based input mapping 605B.

For example, in some embodiments, for a particular software application 604, finger-based input mapping 605A may map single-tap gestures and swipe gestures to the same function or output. Thus, a finger swipe on touchscreen 501, which can be highly inaccurate and therefore difficult to interpret, is instead effectively treated as a single tap in this embodiment. However, for the same software application 604, nanostylus-based input mapping 605B may map a single-tap gesture at a particular location on touchscreen 501 to one function or output and swipe gestures at that location to a different function or output. Thus, the high accuracy of nanostylus-based inputs can be leveraged to provide a richer vocabulary of gesture-based inputs that can be reliably performed on wearable device 600, while a simplified selection of inputs can be employed for finger-based inputs.

In some embodiments, software application 604 is configured to determine whether signals 502A are generated via a finger-based input or via nanostylus-based input, i.e., via nanostylus system 100. Generally, when gesture-based inputs are performed with a finger, users contact touchscreen 501 with much greater force than when gesture-based inputs are performed with nanostylus system 100. Therefore, in some embodiments, software application 604 may be configured to distinguish between signals 502A that are generated via a finger and signals 502A that are generated via a nanostylus system 100. More specifically, software application 604 can be configured to determine how signals 502A are generated based on acceleration/attitudinal output 601A. Thus, when signals 502A are coincident with accelerations that exceed a predetermined threshold, software application 604 may be configured to assume that a finger-based input has generated that particular signal 502A, and employ finger-based input mapping 605A to determine what output to generate or what function to execute when signals 502A are received from touchscreen driver 502.

Figure 7:
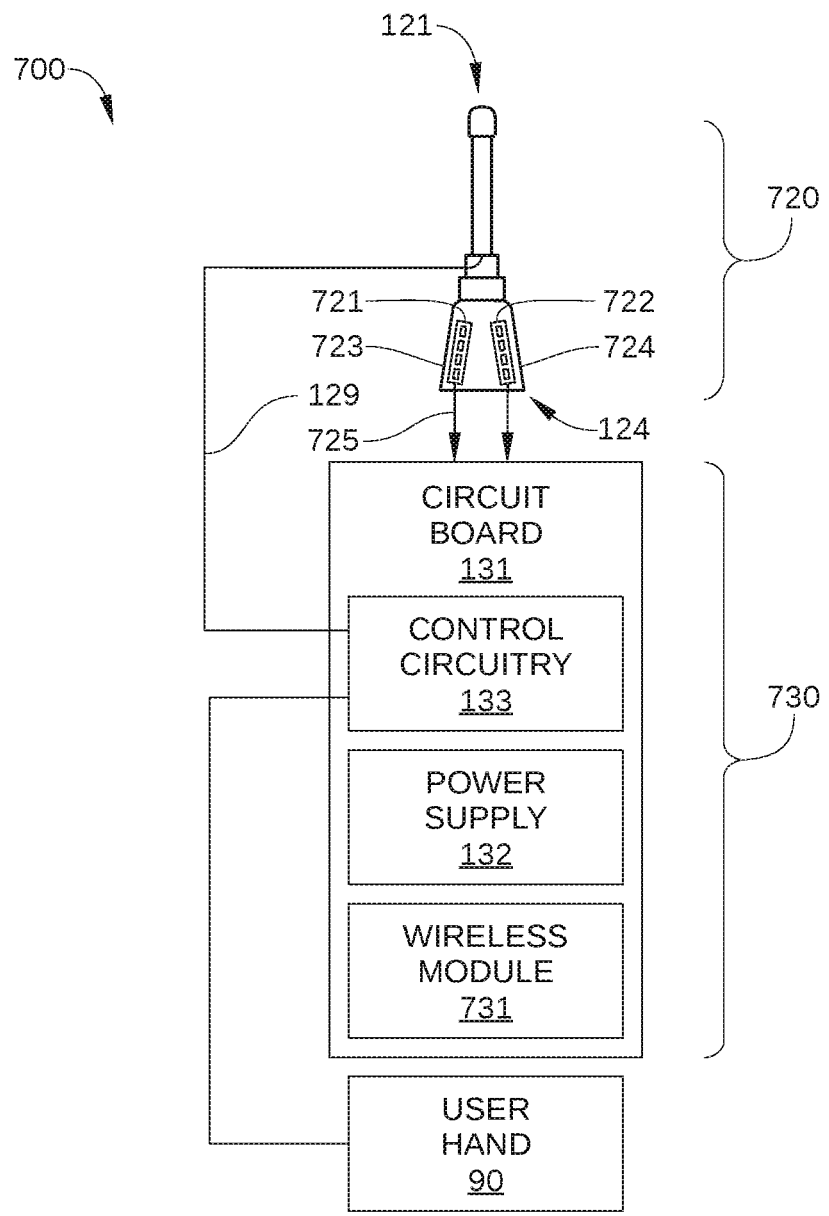
FIG. 7 is a schematic illustration of a nanostylus system, according to various other embodiments of the present invention.

In some embodiments, a nanostylus system may include one or more additional interaction sensors for communicating additional gesture-based inputs to a wearable device. One such embodiment is illustrated in FIG. 7. FIG. 7 is a schematic illustration of a nanostylus system 700, configured according to various aspects of the present invention. Nanostylus system 700 may be substantially similar to nanostylus system 100, except that nanostylus system 700 includes one or more additional touch-sensitive sensors configured for generating gesture-based input based on user touch. In addition, nanostylus system 700 may be configured for wirelessly transmitting the gesture-based input to a wearable device. For instance, in some embodiments, nanostylus system 700 includes a thimble assembly 720 with one or more sensors 721 and 722, and a wrist assembly 730 with a wireless module 731.

Sensors 721 and 722 may be any technically feasible touch-sensitive sensors. In some embodiments, sensors 721 and 722 may include one or more capacitive sensors, resistive sensors, and the like. In some embodiments, touch signals generated in response to a user finger contacting sensor 721 or sensor 722 may be transmitted via a wired connection 725 to wrist assembly 730 and control circuitry 133. In such embodiments, control circuitry 133 may include a dedicated processor and/or controller for processing touch signals received from sensor 721 or sensor 722. In other embodiments, such functionality may be incorporated into the controller for thimble assembly 720. In either case, a tap or hold gesture may be performed on sensor 721 or 722 with a different digit than the finger on which thimble assembly 720 is disposed. Such gestures may be employed as inputs to a wearable device in conjunction with or in addition to touch-based gestures input via nanostylus system 700 and a touchscreen of the wearable device.

In some embodiments, sensor 721 and/or sensor 722 may each include an array of multiple touch-sensitive sensors. For example, in some embodiments, sensor 721 and/or sensor 722 may each be configured as a one-dimensional array of touch-sensitive sensors. One example of such an array is the Freescale MPR121QR2 capacitive touch sensor, which can detect touch on twelve individual electrodes. Thus, in addition to tap, double-tap, and hold gestures, one-dimensional gestures can also be performed via sensor 721 and/or sensor 722, such as swipe gestures. For example, in some embodiments, swiping in one direction along sensor 721 may be interpreted by a particular software application 704 as a pan left input, while swiping in the other direction along sensor 721 may be interpreted by the particular software application 704 as a pan right input. Similarly, the particular software application 704 may be configured to interpret swiping in one direction along sensor 722 as a pan up input, and to interpret swiping in the other direction along sensor 722 as a pan down input. Of course, any other technically feasible inputs or combination of inputs from sensors 721 and 722 may be employed by a suitably configured software application 704 running on a wearable device, including single taps, double-taps, hold gestures, and the like.

In some embodiments, sensor 721 is disposed on a first side 723 of fingertip case 124 and sensor 722 is disposed on a second side 724 of fingertip case 124. For example, in some embodiments, first side 723 is on an opposite side of fingertip case 124 from second side 724. Thus, in such embodiments, fingertip case 124 can be positioned on the index finger of user hand 90 so that first side 723 can be touched by the thumb of user hand 90 and second side 724 can be touched by the middle finger of user hand 90. Consequently, besides contacting a touchscreen of a wearable device with ultra-thin nib 121 of nanostylus system 700, additional gestures that are input via sensors 721 and 722 may be readily performed by a user to interact with the wearable device. For example, a touch or hold gesture may be performed with either the thumb or forefinger of user hand 90, either when ultra-thin nib 121 is contacting a touchscreen of the wearable device, when ultra-thin nib 121 is hovering proximate the touchscreen, or when ultra-thin nib 121 is not proximate the touchscreen. Furthermore, a suitably configured software application 704 may associate a different input in each case. In this way, a rich vocabulary of gesture-based inputs can be reliably performed on a wearable device via nanostylus system 700.

Wireless module 731 may be any technically feasible wireless communication module, chip, or circuit configured to wirelessly link to and communicate with a wearable device, for example via wireless signals 731A. For example, in some embodiments, wireless module 731 may include a Bluetooth module.

Figure 8:
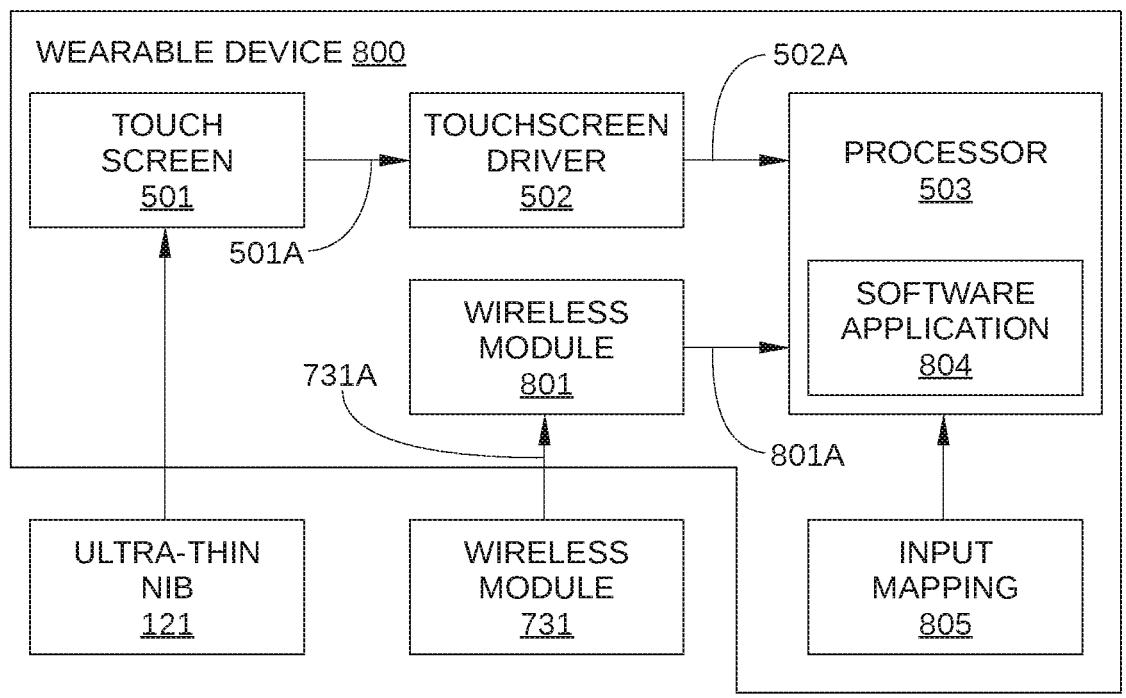
FIG. 8 is a block diagram illustrating the interaction of the nanostylus system of FIG. 7 with a wearable device, according to another embodiment of the present invention.

FIG. 8 is a block diagram illustrating interaction of nanostylus system 700 with a wearable device 800, according to another embodiment of the present invention. Wearable device 800 may be substantially similar to wearable device 500 of FIG. 5, with the addition of a wireless module 801, a particularly configured software application 804, and an input mapping 805.

Wireless module 801 may be any suitably configured wireless communication module, chip, or circuit configured to wirelessly link to and communicate with devices external to wearable device 800. Thus, wireless module 801 is configured to receive wireless signals 731A from wireless module 731 and to translate wireless signals 731A into specific touch-based gestures, including taps, double-taps, holds, and/or swipes. As described above, the touch-based gestures associated with wireless signals 731A are generated via sensor 721 and/or sensor 722. Wireless module 801 then transmits these touch-based gestures in any suitable protocol to software application 804 running on processor 503 via signals 801A.

Software application 804 may be substantially similar to software application 504 of FIG. 5, except that software application 804 is also configured to interpret touch-based gestures associated with signals 801A in addition to signals 502A. Thus, in operation, software application 804 receives signals 502A from touchscreen driver 502 and signals 801A from wireless module 801. Then, based on input mapping 805 stored locally in wearable device 800, software application 804 generates whatever output or executes whatever function is mapped to the touch-based gesture associated with signals 502A and/or signals 801A.

In some embodiments, input mapping 805 may include inputs for software application 804 that are associated with signals 502A, other inputs for software application 804 that are associated with signals 801A, and yet other inputs for software application 804 that are associated with combinations of signals 502A and signals 801A. Thus, input mapping 805 may include a much more extensive vocabulary of possible inputs for a particular software application 804 than that allowed by simple finger taps or nanostylus gestures. For example, a user may perform a particular gesture-based input by contacting touchscreen 501 of wearable device 800 with ultra-thin nib 121, and this particular gesture-based input may be interpreted by software application 804 in multiple different ways, depending on whether another gesture-based input is also being performed via sensor 721 or sensor 722.

Figure 9:
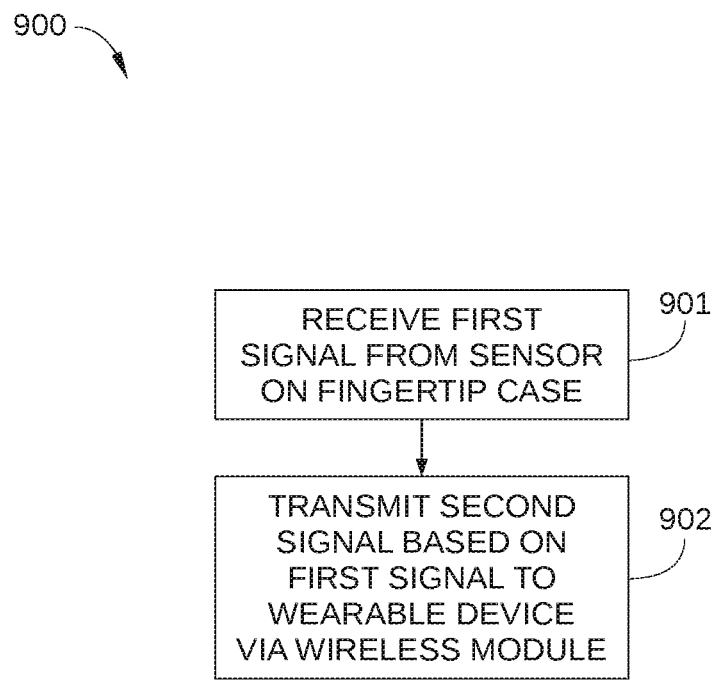
FIG. 9 is a flowchart of method steps for interacting with a wearable computing device, according to various embodiments of the present invention.

FIG. 9 is a flowchart of method steps for interacting with a computing device, according to various embodiments of the present invention. Although the method steps are described in conjunction with the systems of FIGS. 1-8, persons skilled in the art will understand that any system configured to perform the method steps, in any order, is within the scope of the present invention.

As shown, a method 900 begins at step 901, where control circuitry 133 of a nanostylus system receives a first signal from a sensor disposed on a fingertip case of a finger-mounted stylus. For example, control circuitry 133 may receive a signal from sensor 721 or 722 in response to a user performing a touch-based gesture on sensor 721 or 722, such as a single-tap gesture, a double-tap gesture, or a swipe gesture. Thus, the first signal corresponds to a gesture involving contact with at least a portion of sensor 721 or sensor 722.

In step 902, control circuitry 133 causes wireless module 731 to transmit to a wearable computing device, e.g., wearable device 800, a second signal based on the first signal received in step 901. For example, the second signal may include wireless signals 731A, which are based on a signal received via wired connection 725 from fingertip case 124. As described above in conjunction with FIG. 8, the second signal that is transmitted in step 902 corresponds to an entry in a mapping of gestures to inputs for a software application running on the wearable device, such as input mapping 804.

In some embodiments, input mapping 804 may include entries associated with a pairing of the above-described second signal with a third signal. Specifically, the third signal is a signal generated in response to a screen interaction, such as signals 502A received from touchscreen driver 502. For example, in some embodiments, the third signal is generated by a touchscreen or touchscreen driver of the wearable computing device, such as touchscreen driver 502. Thus, the third signal may be generated in response to a touch-based gesture on touchscreen 501 of the wearable device, such as a nanostylus tap or swipe. In such embodiments, input mapping 804 may include multiple entries associated with the second signal, where each entry corresponds to a different software input for software application 804. Consequently, software application 804 may interpret a particular second signal as one of multiple software inputs, depending on whether software application 804 receives the second signal in conjunction with the above-described third signal.

Furthermore, in some embodiments, the second signal that is transmitted in step 902 may correspond to an entry in a mapping of gestures that includes entries associated with an input from accelerometer 601 in the wearable computing device, such as input mapping 605. In such embodiments, a software application running on the wearable device may be configured to interpret touch-based gestures associated with signals 502A differently depending on whether signals 502A are generated based on finger-based input or on nanostylus-based input. Therefore, inputs from accelerometer 601 may be used by a software application running on the wearable device to determine whether the second signal corresponds to finger-based gestures or nanostylus-based gestures.

Figure 10:
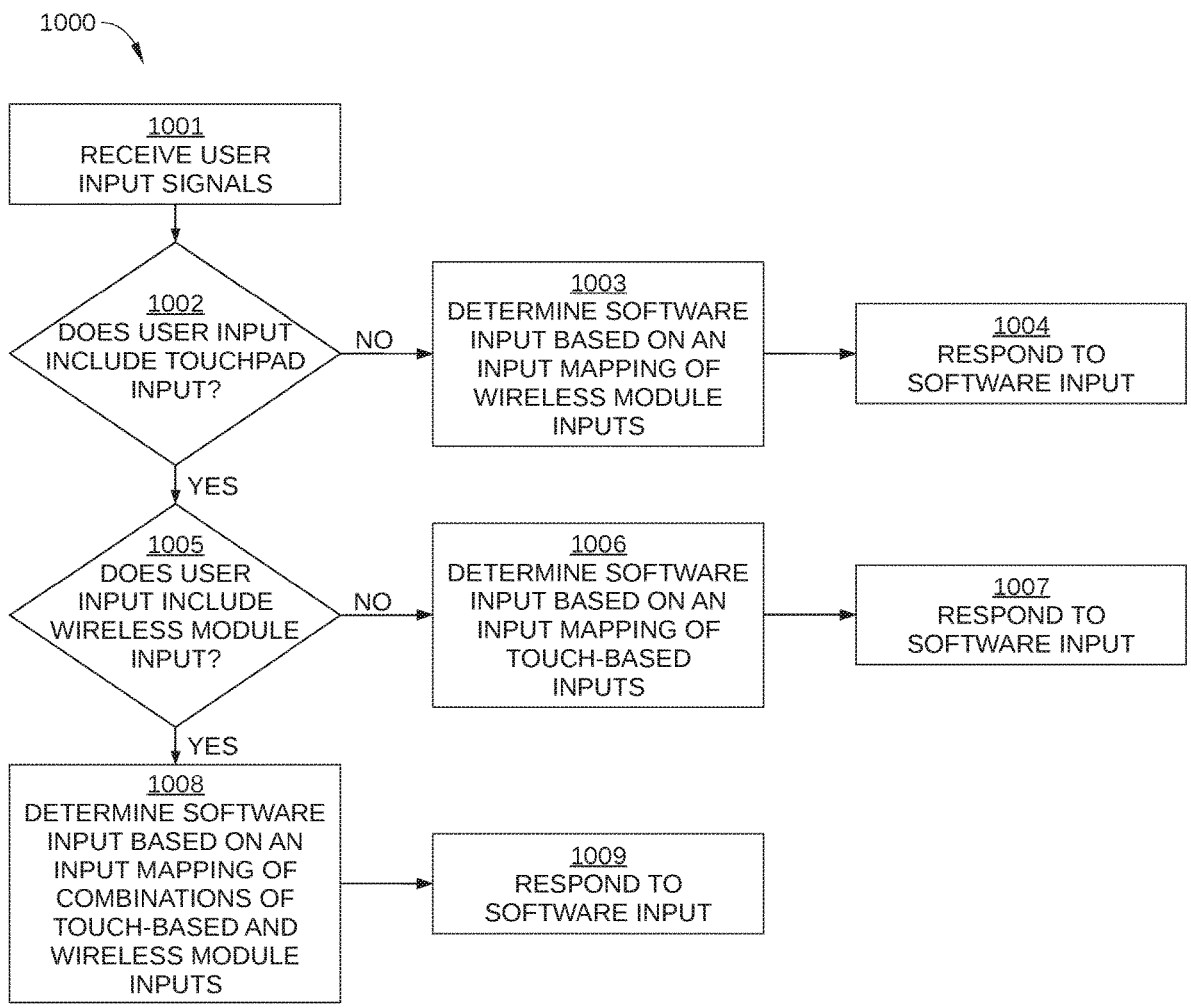
FIG. 10 is a flowchart of method steps for processing inputs received from a finger-mounted stylus, according to various embodiments of the present invention.

FIG. 10 is a flowchart of method steps for processing inputs received from a finger-mounted stylus, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1000 begins at step 1001, where a software application running on a wearable device receives user input signals. For example, software application 804 of wearable device 800 may receive either signals 502A from touchscreen driver 502, signals 801A from wireless module 801, or a combination of both. Thus, the user input signals may be received in response to a user touching ultra-thin nib 121 to touchscreen 501, the user touching a portion of sensor 721 or 722 with a digit, or a combination of both.

In step 1002, the software application determines whether the user input signal includes a touchpad input, such as signals 502A from touchscreen driver 502. If yes, method 1000 proceeds to step 1005; if no, method 1000 proceeds to step 1003.

In step 1003, the software application determines a software input based on a mapping of wireless module inputs. That is, an input for the software application that is mapped to the particular signals 801A received in step 1001 is determined. Signals 801A may be associated with, for example and without limitation, a swipe or tap performed by the user on a portion of sensor 721 or 722. It is noted that the mapping of wireless module inputs is generally customized for a particular software application running on the wearable device.

In step 1004, the software application responds to the software input determined in step 1003.

In step 1005, the software application determines whether the user input signal includes a wireless module input, such as signals 801A from wireless module 801. If yes, method 1000 proceeds to step 1008; if no, method 1000 proceeds to step 1006.

In step 1006, the software application determines a software input based on a mapping of touchpad inputs. That is, an input for the software application that is mapped to the particular signals 502A received in step 1001 is determined. Signals 502A may be associated with, for example and without limitation, a swipe, tap, or double tap performed by the user on touchscreen 501 with ultra-thin nib 121. It is noted that the mapping of touchpad inputs is generally customized for a particular software application running on the wearable device.

In step 1007, the software application responds to the software input determined in step 1003.

In step 1008, the software application determines a software input based on a mapping of combinations of touchpad inputs and wireless module inputs. That is, an input for the software application that is mapped to the particular combination of signals of 502A and signals 801A received in step 1001 is determined. It is noted that the mapping of combinations of touchpad inputs and wireless module inputs is generally customized for a particular software application running on the wearable device.

In step 1009, the software application responds to the software input determined in step 1008.

Implementation of method 1000 by a suitably configured software application running on a wearable device enables a user to interact with the wearable device via multiple modalities: via ultra-thin nib 121 of nanostylus system 100, via sensors 721 or 722 disposed on fingertip case 124, or a combination of both. Thus, a user may employ a greatly expanded vocabulary of gesture-based inputs compared to conventional input techniques associated with wearable devices.

In sum, embodiments of the present invention provide for interacting with a wearable computing device via an ultra-small touchscreen. A finger-mounted stylus includes an extension arm disposed on a fingertip case and an active stylus with an ultra-thin nib. In some embodiments, the finger-mounted stylus further includes addition touch-sensitive sensors disposed on a side of the fingertip case that enable additional gesture-based inputs to be performed by a user in conjunction with touchscreen inputs. In some embodiments, a wearable device can receive inputs via multiple modalities, i.e., via the finger-mounted stylus and/or via the touch-sensitive sensors disposed on the side of the fingertip case.

One advantage of the embodiments is that occlusion of a touchscreen when inputs are performed is greatly reduced and precise and accurate screen interactions on an ultra-small screen are enabled. Another advantage of the embodiments is that much smaller icons can be displayed on a wearable device for receiving input, since the finger-mounted stylus can be placed with such high precision on an ultra-small display screen. A further advantage of the embodiments is that the vocabulary of gesture-based inputs that can be reliably performed on a wearable device is greatly expanded.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for processing inputs from a finger-mounted stylus system interacting with a computing device, the method comprising:
   receiving, via a nib disposed on the finger-mounted stylus system, a first signal associated with a user input from a user, wherein:
     the nib comprises a conductive tip and a conductive extension that is isolated from a fingertip case of the finger-mounted stylus system by an insulator, and
     the conductive extension is configured to position the nib to reduce occlusion from the user, by the nib, of any surface of the computing device;

determining that the first signal corresponds to a gesture involving contact between the finger-mounted stylus system and the computing device by determining that a first acceleration coincident with the first signal detected by an accelerometer exceeds a predefined threshold acceleration; and in response, determining a software input for a software application running on the computing device based on a mapping of wireless module inputs to software inputs for the software application.

2. The method of claim 1, further comprising:
receiving a second signal associated with the user input;
determining that the second signal is associated with a touch-based input; and
in response, determining a software input for the software application based on a mapping of combinations of touch-based inputs and wireless module inputs to software inputs for the software application.

3. The method of claim 2, wherein the second signal is received concurrently with the first signal.

4. The method of claim 2, wherein the second signal is received from a touchscreen of the computing device.

5. The method of claim 2, wherein at least one of the first signal or the second signal is received in response to a user interacting with the computing device.

6. The method of claim 1, wherein the first signal is generated in response to a digit of a user contacting at least a portion of an array of touch-sensitive sensors disposed on a fingertip case of the finger-mounted stylus system.

7. The method of claim 6, wherein the digit of the user contacting at least the portion of the array comprises the user performing one of a tap gesture, a hold gesture, or a swipe gesture.

8. The method of claim 1, wherein the first signal corresponds to a first software input in the mapping of wireless module inputs to software inputs when the first signal is received while a stylus coupled to the fingertip case is in physical contact with a touchscreen of the computing device.

9. The method of claim 8, wherein the first signal corresponds to a second software input in the mapping of wireless module inputs when the first signal is received while the stylus coupled to the fingertip case is proximate to but not in physical contact with the touchscreen.

10. The method of claim 1, wherein the mapping of wireless module inputs is configured to include entries associated with an input from the accelerometer.

11. The method of claim 1, wherein the conductive tip is disposed on the conductive extension.

12. A non-transitory computer-readable storage medium including instructions that, when executed by one or more processors, configure the one or more processors to control a computing device, by performing the steps of:
receiving, via a nib disposed on a finger-mounted stylus system, a first signal associated with a user input from a user, wherein:
the nib comprises a conductive tip and a conductive extension that is isolated from a fingertip case of the finger-mounted stylus system by an insulator, and
the conductive extension is configured to position the nib to reduce occlusion from the user, by the nib, of any surface of the computing device;
determining that the first signal corresponds to a gesture involving contact between the finger-mounted stylus system and the computing device by determining that a first acceleration coincident with the first signal detected by an accelerometer exceeds a predefined threshold acceleration; and
in response, determining a software input for a software application running on the computing device based on a mapping of wireless module inputs to software inputs for the software application.

13. The non-transitory computer-readable storage medium of claim 12, wherein the steps further comprises:
receiving a second signal associated with the user input;
determining that the second signal is associated with a touch-based input; and
in response, determining a software input for the software application based on a mapping of combinations of touch-based inputs and wireless module inputs to software inputs for the software application.

14. The non-transitory computer-readable storage medium of claim 13, wherein the second signal is received concurrently with the first signal.

15. The non-transitory computer-readable storage medium of claim 13, wherein the second signal is received from a touchscreen of the computing device.

16. The non-transitory computer-readable storage medium of claim 13, wherein at least one of the first signal or the second signal is received in response to a user interacting with the computing device.

17. The non-transitory computer-readable storage medium of claim 12, wherein the first signal is generated in response to a digit of a user contacting at least a portion of an array of touch-sensitive sensors disposed on a fingertip case of the finger-mounted stylus system.

18. A computing device, comprising:
a wireless module configured to receive, via a nib disposed on a finger-mounted stylus system, a first signal associated with a user input from a user of a finger-mounted stylus system, wherein:
the nib comprises a conductive tip and a conductive extension that is isolated from a fingertip case of the finger-mounted stylus system by an insulator, and
the conductive extension is configured to position the nib to reduce occlusion from the user, by the nib, of any surface of the computing device;
a memory configured to store a software application; and
one or more processors that are coupled to the memory and, when executing the software application, are configured to:
receive the first signal associated with the user input from the user;
determine that the first signal corresponds to a gesture involving contact between the finger-mounted stylus system and the computing device by determining that a first acceleration coincident with the first signal detected by an accelerometer exceeds a predefined threshold acceleration; and
in response, determine a software input for the software application based on a mapping of wireless module inputs to software inputs for the software application.

19. The computing device of claim 18, wherein the one or more processors are further configured to:
receive a second signal associated with the user input;
determine that the second signal is associated with a touch-based input; and
in response, determine a software input for the software application based on a mapping of combinations of touch-based inputs and wireless module inputs to software inputs for the software application.

20. The computing device of claim 19, wherein the second signal is received concurrently with the first signal.

21. The computing device of claim 19, wherein the second signal is received from a touchscreen of the computing device.

* * * * *